(12) United States Patent
Noguchi et al.

(10) Patent No.: US 6,331,340 B1
(45) Date of Patent: Dec. 18, 2001

(54) HONEYCOMB STRUCTURE AND METHOD FOR PREPARING THE SAME

(75) Inventors: Hajime Noguchi; Takaya Komine, both of Akishima (JP)

(73) Assignee: Showa Aircraft Industry Co., Ltd., Tokyo (JP)

( * ) Notice: Subject to any disclaimer, the term of this patent is extended or adjusted under 35 U.S.C. 154(b) by 0 days.

(21) Appl. No.: 09/456,475

(22) Filed: Dec. 9, 1999

(30) Foreign Application Priority Data

Dec. 10, 1998 (JP) .................................................. 10-351509

(51) Int. Cl.⁷ ...................................................... B32B 3/12
(52) U.S. Cl. ........................... 428/116; 428/365; 442/181
(58) Field of Search ................................... 428/116, 365; 442/180, 181

(56) References Cited

U.S. PATENT DOCUMENTS 5,260,117 * 11/1993 Myers et al. .

FOREIGN PATENT DOCUMENTS

WO 91/03378    3/1991   (WO) .
WO 92/16362   10/1992   (WO) .

* cited by examiner

*Primary Examiner*—Deborah Jones
*Assistant Examiner*—Wendy Boss
(74) *Attorney, Agent, or Firm*—Morrison & Foerster LLP

(57) ABSTRACT

A honeycomb structure comprising a supporting base of glass fibers impregnated with a polyamide imide resin prepolymer. The honeycomb structure is free of radio obstruction problem and is excellent in mechanical strength and heat formability to curved surface.

4 Claims, No Drawings

HONEYCOMB STRUCTURE AND METHOD FOR PREPARING THE SAME

BACKGROUND OF THE INVENTION

The present invention relates to a honeycomb structure and a method for preparing the same.

The honeycomb structure comprises planar bulk materials of hollow prismatic cells. The heat-resistant honeycomb structure is used in, for instance, peripheral machinery and tools of engines for airplanes, sandwich panels used at portions which are exposed to a high temperature and structural members used in, for instance, airplanes and space machinery and tools which are exposed to high temperature and pressure and have high heat resistance over a long time period in an environment or at a normal service temperature of about 260° C. As base materials for honeycomb structures having a light weight and high mechanical strength and excellent in specific strength with respect to weight, there have conventionally been used, for instance, aluminum foils and kraft paper. As such base materials excellent in heat resistance as well, there have been developed, for instance, those produced by forming metal foils such as stainless steel and titanium foils into honeycomb-like structures and then subjecting the honeycomb structures to brazing process; those prepared by adhering heat-resistant resins such as resol-phenol resins to glass fibers and carbon fibers serving as base materials (fiber reinforced resin honeycomb structure); and those prepared by adhering heat-resistant resins such as resol-phenol resins to synthetic heat-resistant aromatic polyamide paper serving as base materials.

Among them, the fiber reinforced resin honeycomb structure has good specific strength and specific rigidity and therefore it has been used as aircraft parts. If it is used as parts of aircraft engine, it is required to have excellent mechanical strength at high temperature region (120 to 150° C.) and thermoformability into two-dimensional and three-dimensional surface. In order to meet mechanical strength at high temperature region and thermoformability, there has conventionally been used a thermoplastic resin having a glass transition temperature of 250° C. or higher (that is, the resin is softened at a temperature higher than 250° C. which makes the molding of the resin easy) and showing no heat deterioration of mechanical property at a temperature 100° C. lower than the glass transition temperature. However, this thermoplastic resin is solid at an ordinary temperature and does not dissolve in a suitable solvent. Accordingly, it is necessary to heat the resin to 350° C. or higher to convert it to a liquid state before it is used to make a honeycomb structure. For this purpose, a special apparatus for the manufacture of a honeycomb structure is needed, which leads to low efficiency and high cost. Further, the thermoplastic resin itself is expensive.

Moreover, a honeycomb structure comprising a carbon fiber as a base material suffers from radio obstruction problem and therefore, the use thereof is limited.

SUMMARY OF THE INVENTION

Accordingly, it is an object of the present invention to provide a honeycomb structure which is free of radio obstruction problem and is excellent in mechanical strength at a high temperature region ranging from 120 to 150° C. and heat formability to curved surface. It is another object to provide a method for preparing such a honeycomb structure with low cost.

The present invention provides a honeycomb structure comprising a supporting base of glass fibers impregnated with a polyamide imide resin prepolymer.

The present invention also provides a method for preparing a honeycomb structure which comprises the steps of alternately stacking a plurality of corrugated sheets, each of which is produced by corrugating a supporting base of glass fibers impregnated with a polyamide imide resin prepolymer and curing the prepolymer during or after the corrugating step, and a plurality of flat sheets, each of which is prepared by impregnating a supporting base of glass fibers with a polyamide imide resin prepolymer and then curing the prepolymer, through a node bond adhesive; heating the resin under pressure to form a crosslinked and cured laminated structure; impregnating the laminated structure with a polyamide imide resin prepolymer; and curing and crosslinking the prepolymer to obtain a honeycomb structure.

DESCRIPTION OF THE PREFERRED EMBODIMENTS

The present invention will hereinafter be explained in more detail.

The supporting bases of glass fibers used in the honeycomb structure of the present invention are preferably those having a tensile strength in crosswise direction that is 105 to 150% of that in lengthwise direction. The size of the glass fiber constituting the supporting bases of glass fibers is preferably 30 to 210 tex, more preferably 60 to 150 tex. The supporting bases of glass fibers used in the present invention may be, for instance, woven fabrics, knitting fabrics and nonwoven fabrics, more specifically, glass fiber woven fabrics of 120 to 380 g/m², preferably 145 to 220 g/m² such as plain weave fabrics or long shaft weave fabrics. The supporting base suitably has a thickness generally ranging from about 0.15 to 0.25 mm and a width ranging from about 250 to 350 mm. In order to prepare the supporting bases of glass fibers having a tensile strength in crosswise direction (i.e., the direction parallel to shear direction of the honeycomb structure) that is 105 to 150% of that in lengthwise direction, the size (cross section) of fibers in crosswise direction may be increased by 5 to 50%, preferably 10 to 30% as compared with that in lengthwise direction, the number of fibers in crosswise direction may be increased by 5 to 50%, preferably 10 to 30% as compared with that in lengthwise direction, or combinations thereof may be used.

The supporting base of glass fibers is impregnated with a polyamide imide resin prepolymer. The amount thereof to be impregnated into the supporting base suitably ranges from 20 to 80% by weight, preferably 50% by weight as expressed in terms of the solid content thereof. Preferred examples of such polyamide imide resin prepolymer are those represented by the following general formula (1):

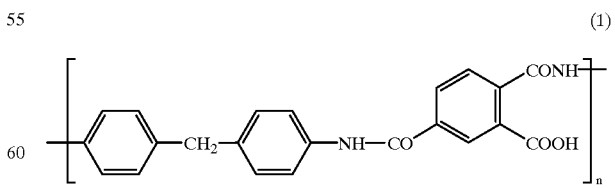

(1)

wherein n is a numerical value ranging from 10 to 100.

The polyamide imide resin prepolymer of the formula (1) is cured by heat to form a polyamide imide resin of the following formula (2).

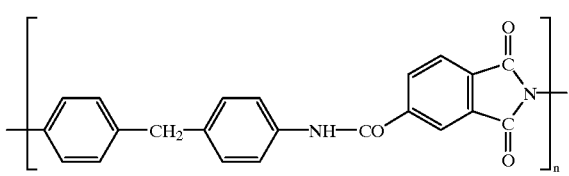
(2)

The polyamide imide resin prepolymer of the formula (1) is commercially available and it may be easily prepared by the method disclosed in Die Angewandte Makromolekulare Chemie 40/41 (1974) 139–158.

The supporting base of glass fibers impregnated with the polyamide imide resin prepolymer is subjected to corrugating using corrugated rolls according to the usual method. The height and width of each corrugation of the resulting corrugated sheet suitably range from 2 to 3 mm and the pitch thereof suitably ranges from 8 to 9 mm.

The supporting base of glass fibers (flat sheet) impregnated with the polyamide imide resin prepolymer is then adhered to a corrugated rack while applying a pressure of 0.1 to 10 kgf/cm$^2$, preferably 5.0 kgf/cm$^2$ by using adhesiveness of the resin. Then, the same type of rack is placed on the top surface of the supporting base and heated at a temperature of 150 to 450° C., preferably 250 to 300° C. at a pressure of 0.1 to 20 kgf/cm$^2$, preferably 6.0 kgf/cm$^2$, for 0.5 to 24 hours, preferably 6 hours to crosslink and cure the resin to thereby prepare a corrugated sheet.

A plurality (for instance, about 150 to 400 sheets each) of the corrugated sheets to which a node bond adhesive of a polyamide imide resin prepolymer is coted on the crest portions of the corrugations in an amount ranging from about 10 to 300 g/m$^2$ and the flat sheets (free of corrugations) of glass fiber supporting base impregnated with the polyamide imide resin prepolymer are alternately stacked and then the resulting stacked sheets are heated at a temperature ranging from about 150 to 450° C., preferably 250° C., at a pressure of 0.1 to 10 kgf/cm$^2$, preferably 1.0 kgf/cm$^2$, for 0.5 to 24 hours, preferably 6 hours to crosslink and cure the resin to thereby prepare a honeycomb structure. Optionally the honeycomb structure thus prepared is further impregnated with the polyamide imide resin prepolymer and then heated with pressure under the same conditions to crosslink the resin to thereby reinforce the honeycomb structure.

The polyamide imide resin prepolymer may be used alone or it may be used in the form of a solution in a suitable solvent such as N-methyl pyrrolidone, dimethylformamide and the like in a solid concentration of 5 to 25% by weight. In particular, it is preferable to use a solution of the prepolymer when a honeycomb structure is impregnated with the prepolymer to reinforce it. These impregnation, evaporation and curing processes of the prepolymer are repeated till the amount of the impregnated prepolymer reaches about 1 to 100 kg/m$^3$, preferably about 50 kg/m$^3$ as expressed in terms of the solid content thereof.

Thereafter, the resulting honeycomb structure thus prepared is cut to a desired thickness, for instance, 0.3 to 3 inches (7.6 to 76 mm) to give the honeycomb structure of the present invention.

Since the present invention uses the polyamide imide resin prepolymer, it is possible to crosslink the resin at a relatively low temperature. It is also possible to prepare a honeycomb structure by using a conventional rack and gear method because of the excellent adhesiveness of the prepolymer.

Since the honeycomb structure of the present invention uses a supporting base of glass fibers, it is excellent in radio permeability and does not cause raido obstruction problem. If a tensile strength in crosswise direction is greater than that in lengthwise direction, it is possible to prevent a reduction of a shear strength.

The present invention will hereinafter be described in more detail with reference to the following non-limitative working Example and the effects practically attained by the invention will also be discussed in detail in comparison with Comparative Example.

EXAMPLE 1

A supporting base of glass woven fabric (135 tex plain weave; density (thread count): 20/25 mm for warp and 18/25 mm for weft directions; thickness: 0.21 mm) having a width of 1 m and a length of 100 m was impregnated with a polyamide imide resin prepolymer (liquid) represented by the formula (1) in such an amount that the content of the prepolymer in the base was 40% by weight. The supporting base of glass woven fabric impregnated with the polyamide imide resin prepolymer was subjected to a corrugating treatment using a corrugated roll. The height and width of the corrugations of the resulting corrugated sheet were set at 2.7 mm and the pitch thereof was set at 8.3 mm.

The supporting base of glass woven fabric (flat sheet) impregnated with the polyamide imide resin prepolymer was then adhered to a corrugated rack while applying a pressure of 5.0 kgf/cm$^2$ by using adhesiveness of the resin. Then, the same type of rack was placed on the top surface of the supporting base and heated at a temperature of 250° C. at a pressure of 6.0 kgf/cm$^2$, for 6 hours to crosslink and cure the resin to thereby prepare a corrugated sheet.

A plurality (300 sheets each) of the corrugated sheets to which a node bond adhesive of a polyamide imide resin prepolymer was coated on the crest portions of the corrugations in an amount of 50 g/m$^2$ and the flat sheets (free of corrugations) of glass woven fabric supporting base impregnated with the polyamide imide resin prepolymer were alternately stacked through the adhesive and then the resulting stacked sheets were heated at a temperature of 250° C., at a pressure of 1.0 kgf/cm$^2$, for 6 hours to crosslink and cure the resin to thereby prepare a honeycomb structure.

The honeycomb structure thus prepared was further impregnated with the polyamide imide resin prepolymer dissolved in N-methyl pyrrolidone in a concentration of 10% by weight. The solvent was evaporated at 205° C. for one hour and heated with pressure under the same conditions to crosslink the resin to thereby reinforce the honeycomb structure.

These impregnation, evaporation and curing processes of the prepolymer were repeated four times till the amount of the impregnated prepolymer reached 32 kg/m$^3$ as expressed in terms of the solid content thereof.

Thereafter, the resulting honeycomb structure thus prepared was cut to a thickness of 12.7 mm to give the honeycomb structure of the present invention.

COMPARATIVE EXAMPLE 1

The same procedures used in Example 1 were repeated except that the supporting base of glass woven fabric (135 tex plain weave; density (thread count): 19/25 mm for warp and 19/25 mm for weft directions; thickness: 0.21 mm) having a width of 1 m and a length of 100 m was substituted for the supporting base of glass woven fabric (135 tex plain weave; density (thread count): 20/25 mm for warp and 18/25 mm for weft directions; thickness: 0.21 mm) having a width of 1 m and a length of 100 m to obtain a honeycomb structure having the same density as in Example 1.

A compression strength in crosswise direction and a shear strength in crosswise and lengthwise directions were measured for the honeycomb structures of Example 1 and Comparative Example 1. A ratio of the strength of the honeycomb structure of Example 1 to that of Comparative Example 1 is shown in the following table.

|  | Compression strength ratio | Shear strength ratio | |
| --- | --- | --- | --- |
|  | crosswise | crosswise | lengthwise |
| Example 1 | 0.94 | 1.07 | 1.02 |
| Comparative Example 1 | 1.00 | 1.00 | 1.00 |

The table clearly shows that a shear strength of the honeycomb structure increases by using a supporting base of glass fibers having a tensile strength in crosswise direction greater than that in lengthwise direction.

What is claimed is:

1. A honeycomb structure comprising a supporting base of glass fibers impregnated with a polyamide imide resin prepolymer, wherein the supporting base of glass fibers has a tensile strength in crosswise direction that is 105 to 150% of that in lengthwise direction.

2. The honeycomb structure of claim 1 wherein the supporting base of glass fibers is woven fabric.

3. The honeycomb structure of claim 1 wherein the polyamide imide resin prepolymer is represented by the following general formula (1):

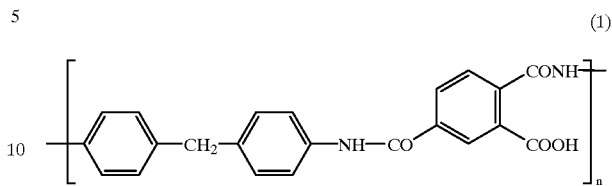

wherein n is a numerical value ranging from 10 to 100.

4. A honeycomb structure comprising a supporting base of glass fibers impregnated with a polyamide imide resin prepolymer, wherein the polyamide imide resin prepolymer is represented by the following general formula (1):

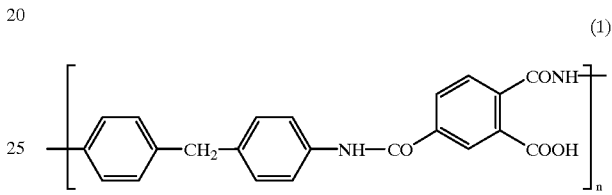

wherein n is a numerical value ranging from 10 to 100.

* * * * *